Patented Mar. 26, 1940

2,194,544

UNITED STATES PATENT OFFICE 2,194,544

GELATINIZED HIGH EXPLOSIVE COMPOSITIONS

Hartwell Henry Fassnacht, Wenonah, N. J., assignor to E. I. du Pont de Nemours & Company, Wilmington, Del., a corporation of Delaware No Drawing. Application October 27, 1938, Serial No. 237,194

9 Claims. (Cl. 52—13)

This invention relates to the preparation of gelatinized high explosives, and more particularly to the acceleration of the gelatinization of nitrocellulose with nitroglycerin and with nitroglycerin solutions of aliphatic nitric esters or nitrocompounds.

It is well known that, when certain otherwise desirable nitrated materials are present dissolved in the nitroglycerin, the gelatinization of the solution with nitrocellulose quite often is undesirably slow, and in many cases incomplete. When such incomplete gelatinization takes place, the finished explosive is unsatisfactory because its performance varies during storage. Moreover, such explosives are apt to be non-homogeneous with respect to plasticity, and often are characterized by the exudation of nitroglycerin therefrom.

The object of the present invention is a new and improved high explosive composition containing a gelatinized liquid nitric ester of enhanced properties. A further object is such a composition in which the gelatinization with nitrocellulose has been accelerated and the properties of the finished product thereby improved. A still further object is a novel process for effecting the aforesaid accelerated gelatinization. Additional objects will be disclosed as the invention is described more fully hereinafter.

I have found that the foregoing objects are accomplished by incorporating with the liquid nitric ester an aliphatic monohydric alcohol containing a carbonyl group. The aliphatic monohydric alcohol containing a carbonyl group may be represented by the formula R—CO—$R_1$, wherein R is an alkyl radical or hydrogen and $R_1$ is an alkyl radical having one hydrogen group replaced by a hydroxyl group. For example, diacetone alcohol ($CH_3CO$—$CH_2$—$C(CH_3)_2$—OH), which may be classed as a hydroxy ketone, has proved a very desirable gelatinization accelerant when employed in conjunction with nitroglycerin gelatinized by means of nitrocellulose. As specific examples of compounds found advantageous for use as gelatinization accelerants, I may cite acetyl carbinol ($CH_3$—CO—$CH_2OH$), propionyl carbinol ($C_2H_5$—CO—$CH_2OH$), glycolic aldehyde ($CH_2OH$—CHO).

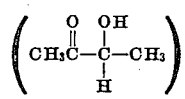

acetyl methyl carbinol

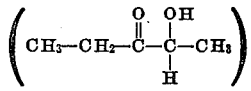

propionyl methyl carbinol

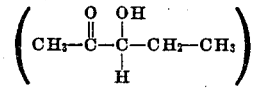

acetyl ethyl carbinol and

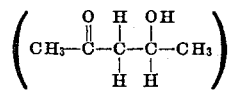

2 hydroxy pentan-4-one

The foregoing accelerants according to my invention are advantageous when used in conjunction with gelatinized nitroglycerin high explosives generally, inasmuch as they reduce the time required for suitable gelatinization, but they are particularly efficacious where tetranitrodiglycerin is present in solution in nitroglycerin, because such solutions attain outstanding importance by the addition of said compounds thereto. The invention is applicable with high efficiency in case of the standard straight and ammonia gelatin dynamites as well as with the so-called semi-gelatins where smaller percentages of nitrocellulose are present and a lower degree of gelatinization is effected. By its adoption, not only is gelatinization accomplished more quickly, but the gelatinization is more uniform and complete, so that a product of superior stability is obtained.

In order to describe my invention more fully, the process of producing the improved gelatinous high explosive composition is illustrated below. The required amount of nitroglycerin containing dissolved tetranitrodiglycerin is introduced into a container adapted for the mixing of these ingredients. Diacetone alcohol in an amount varying from 1 to 5%, depending upon the particular ratio of nitroglycerin and tetranitrodiglycerin, is then added to the nitroglycerin and dissolved therein. A predetermined amount of nitrocellulose having desired properties is now introduced into the nitroglycerin. The mixture is then agitated while maintaining the temperature at approximately 120° F. After the solution has thickened or gelatinized to the proper degree, the solid ingredients of the dynamite which already have been thoroughly mixed are incorporated therein. These ingredients may comprise ammonium nitrate, sodium nitrate, combustible dope ingredients, and chalk in the desired proportions. Following the addition of these latter ingredients, the mixing is continued until the finished explosive has the proper consistency. It is then removed from the container and cartridged according to known methods.

Further illustration of my invention is furnished in the following examples of gel compositions prepared with my accelerants.

|  | 1 | 2 | 3 | 4 |
|---|---|---|---|---|
| NG (25% to 35% TNDG) | 25.00 | 29.0 | 32.00 | 20.0 |
| Diacetone alcohol | 0.25 |  |  |  |
| Glycollic aldehyde |  | 0.3 |  |  |
| Acetyl methyl carbinol |  |  | 0.30 |  |
| Acetyl carbinol |  |  |  | 0.2 |
| Nitrocotton | 0.50 | 0.8 | 0.75 | 0.3 |
| Ammonium nitrate | 8.80 | 28.2 |  | 63.5 |
| Sodium nitrate | 50.30 | 32.0 | 53.50 | 7.4 |
| Combustible dope | 14.65 | 9.2 | 12.95 | 8.1 |
| Chalk | 0.50 | 0.5 | 0.50 | 0.5 |

The numerals in columns 1 through 4 indicate of course, the per cent by weight of the ingredients in question.

It will be noted that the first three compositions fall within the broad classification of gelatins, whereas composition 4 constitutes a semi-gelatin.

Although amounts varying from 0.1 to 5% of the aliphatic monohydric alcohol containing a carbonyl group may be employed, my preferred range is between 0.5 and 2% of the weight of the nitroglycerin used.

In carrying out my invention, nitroglycerin may be used alone as liquid explosive nitric ester, if desired, although other nitric esters may be employed, such as ethylene glycol dinitrate, either alone or in combination with nitroglycerin. Moreover, other nitric esters and nitrocompounds may be present also dissolved in the liquid nitric ester. Furthermore, such materials may be used for making the explosive composition more resistant to freezing, etc., among which may be cited tetranitrodiglycerin, nitrated sugars, aromatic nitrocompounds, nitrochlorhydrins, and the like.

Explosive compositions made in accordance with my invention possess material advantages over similar compositions containing no specific gelatinization accelerant. In the case of ammonia gelatins, for example, containing tetranitrodiglycerin dissolved in nitroglycerin or any of the accelerants enumerated in the foregoing, the finished explosive is free from leakiness after a long storage interval under severe conditions and retains its initial high degree of plasticity. Similar retention of the desired properties, characterizing the explosive compositions as originally processed, is evident in the case of semi-gelatins as well as other gelatinous high explosive compositions. The acceleration of gelatinization effected by adoption of one of the compounds enumerated herein may be illustrated quite well by the results of small scale gelatinization tests in which the degree of gelatinization of the nitroglycerin is indicated by the time required for the material to flow a given distance at a definite angle of inclination. The following table shows a comparison of the effect of diacetone alcohol and dinitrotoluene as accelerants.

Table I

|  | A | B | C |
|---|---|---|---|
| Nitroglycerin | 50.0 gms. | 50.0 gms. | 50.0 gms. |
| Nitrocotton | 1.2 | 1.2 | 1.2 |
| Dinitrotoluene |  | 0.5 |  |
| Diacetone alcohol |  |  | 0.5 |
| Time of flow | Instantaneous | 1.0 sec. | 67.0 sec. |

From the foregoing table, it will be noted that the composition consisting solely of nitroglycerin and nitrocotton gave practically an instantaneous flow result, whereas the addition of 0.5% dinitrotoluene to this composition exerted sufficient gelatinization effect to require a time of 1.0 second for the flow test. The addition of a similar amount of diacetone alcohol to the original composition, however, produced a much greater degree of gelatinization, as shown by the fact that 67 seconds were required for the solution to flow over the same distance.

It will be understood that many variations in details may be made without departing from the scope of the invention. For example, although I have described the use of an aliphatic monohydric alcohol containing a carbonyl group as the sole accelerant, it is obvious that such accelerant may be employed together with an accelerant of the prior art, for example ethylene glycol monoethyl ether, where it might be advantageous to do so. I intend to be limited, therefore, only by the following patent claims.

I claim:

1. A high explosive composition comprising a liquid explosive nitric ester gelatinized with nitrocellulose and an aliphatic alcohol having the formula R—CO—R₁, in which R is an alkyl radical or hydrogen and R₁ is an alkyl radical having one hydrogen group replaced by a hydroxyl group.

2. The explosive composition of claim 1 wherein the accelerant is diacetone alcohol.

3. The explosive composition of claim 1 wherein the accelerant is acetyl carbinol.

4. The explosive composition of claim 1 wherein the accelerant is propionyl carbinol.

5. The process of accelerating the gelatinization of nitrocellulose with a liquid explosive nitric ester, which process comprises effecting said gelatinization in the presence of an aliphatic monohydric alcohol containing a carbonyl group.

6. The process of accelerating the gelatinization of nitrocellulose with a liquid explosive nitric ester, which process comprises effecting said gelatinization in the presence of diacetone alcohol.

7. The process of accelerating the gelatinization of nitrocellulose with nitroglycerin, which process comprises effecting said gelatinization in the presence of diacetone alcohol in an amount between 0.1 and 5.0% of the nitroglycerin present.

8. A high explosive composition comprising a liquid explosive nitric ester and nitrocellulose and an aliphatic monohydric alcohol containing a carbonyl group, said monohydroxy alcohol being present in an amount between 0.1 and 5.0% of the nitroglycerin present.

9. An explosive composition comprising a solution of tetranitrodiglycerin in nitroglycerin, said solution being gelatinized by nitrocellulose, and a gelatinization accelerant consisting of an aliphatic monohydric alcohol containing a carbonyl group.

HARTWELL H. FASSNACHT.